UNITED STATES PATENT OFFICE.

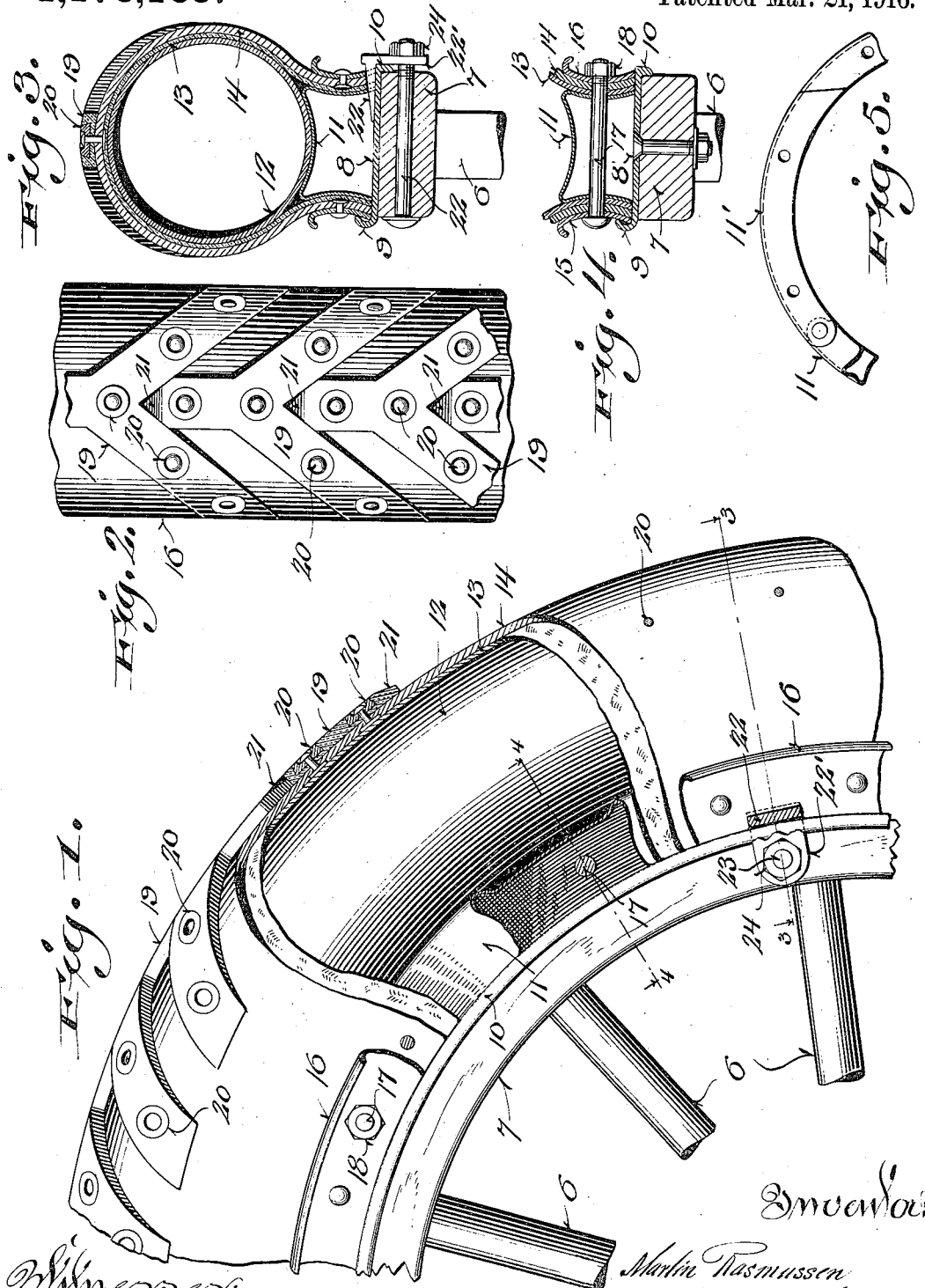

MARTIN RASMUSSEN, OF RACINE, WISCONSIN.

RESILIENT TIRE.

1,176,165.　　　　Specification of Letters Patent.　　Patented Mar. 21, 1916.

Application filed April 1, 1914.　Serial No. 828,671.

*To all whom it may concern:*

Be it known that I, MARTIN RASMUSSEN, a subject of the King of Denmark, but having filed my intention to become a citizen of the United States, and resident of Racine, in the county of Racine and State of Wisconsin, have invented certain new and useful Improvements in Resilient Tires; and I do hereby declare that the following is a full, clear, and exact description thereof.

My invention consists in what is herein particularly set forth with reference to the accompanying drawings and pointed out in the claim of this specification, its object being to provide simple, economical, durable and readily detachable resilient tires of peculiar tread, each having an inflatable tube thereof on an inwardly flanged ring assembled with other elements of the tire and which fits upon the rim of a wheel to therewith form an advantageous air space.

Figure 1 of the drawings represents a side elevation partly in section of a fragment of a wheel having a resilient tire in accordance with my invention; Fig. 2, a front elevation of a fragment of the tire; Figs. 3 and 4, cross-sections indicated by lines 3—3 and 4—4 respectively in Fig. 1, and Fig. 5, a side elevation of a fragment of a ring constituting an element of said tire.

Referring by numerals to the drawings, 6 indicates spokes and 7 the felly of a wooden wheel. Bolted on the felly is a rim 8 having one longitudinal edge provided with an outwardly extending clencher-flange 9 and its other longitudinal edge provided with an inwardly extending felly-engaging flange 10. Fitting the band 8 are inwardly extending outwardly concave side flanges of an outwardly concave metal clamping ring 11 on which to seat an inflatable inner tube 12, and the clamping ring has an inwardly opening hinged section 11' shown in Fig. 5, by which provision is had for contraction of said ring to facilitate placing of said tube thereon.

The clamping ring 11 and tube 12 are shown within a lining 13 of a pliable outer casing 14, and riveted to the casing are inner and outer stay-rings 15, 16, respectively. These rings conform in contour to the flanges of said clamping ring and their outer edges are rounding in opposition to said casing to prevent cutting of the same when compressed thereon.

The clamping ring and the casing with its stay-rings are held together by transverse bolts 17 and clamp-nuts 18 run on the bolts, said bolts being at suitable intervals apart.

The casing is provided with a tread of herring-bone pattern in one continuous piece or matching sections. This tread is preferably of vulcanized rubber material 19 having reinforcing metallic studs 20 molded therein and riveted to the casing. If the tread be in sections, points of its vertebræ will be depressed, as shown at 21, to prevent detrimental catching of the same upon anything in their path, and sand or pebbles working in between the tread and casing will work out again into the spaces between the ribs of said tread.

The tire as a whole comprises the ring, the inflatable tube, the lined casing with its stay-rings and tread, together with the bolts and clamping-nuts aforesaid. The ring is such as to space the inflatable tube away from the wheel rim and to provide an advantageous air space back of said tube, said tire as a whole being clamped on the felly-band against the clencher-flange thereof.

At intervals of the tire, the stay-ring 16, the casing and the outer side flange of the rim are recessed to fit on wedges that slide upon the felly-band to clamp said tire in place. Each wedge 22 is provided with an outer right-angle shank 22' engaged by a bolt 23 that extends through the felly transversely of the same, and a nut 24 on the bolt is run against said shank to drive in the wedge. By removal of the nuts 24 and the wedges 22, the tire as a whole is free for detachment from the wheel, and the ring and casing may be as readily separated when it is necessary to get at the inflatable tube.

I claim:—

A resilient tire comprising an angular metal spacing ring, an inflatable tube on the ring, a tube casing, outer metal stay rings carried by the casing, bolts uniting the stay rings, casing, and spacing rings, clamping nuts carried by the bolts, one of the stay rings, the casing and a side of the spacing ring being recessed at intervals, and clamping wedges engaging said recesses.

In testimony that I claim the foregoing I have hereunto set my hand at Racine, in the county of Racine and State of Wisconsin, in the presence of two witnesses.

MARTIN RASMUSSEN.

Witnesses:
BART C. THRONSON,
GUST MARTINS.